United States Patent

[11] 3,603,863

| | | | | |
|---|---|---|---|---|
| [72] | Inventor | Floyd Grossoehme<br>Cincinnati, Ohio | 3,101,455 8/1963 Masher | 307/313 X |
| [21] | Appl. No. | 870,832 | 3,332,001 7/1967 Schwarz | 321/45 X |
| [22] | Filed | May 9, 1969 | | |
| | | Division of Ser. No. 506,993, Nov. 9, 1965, Pat. No. 3,501,687 | | |
| [45] | Patented | Sept. 7, 1971 | | |
| [73] | Assignee | General Electric Company | | |

Primary Examiner—J. D. Miller
Assistant Examiner—A. D. Pellinen
Attorneys—Derek P. Lawrence, Oscar B. Waddell, Frank L. Neuhauser, Lee H. Sachs, Thomas J. Bird, Jr. and Joseph B. Forman

[54] CIRCUITRY FOR GENERATING A SQUARE WAVE OF FIXED VOLTAGE AMPLITUDE AND VARIABLE FREQUENCY
2 Claims, 1 Drawing Fig.

[52] U.S. Cl. .................................................. 321/2, 321/45 R
[51] Int. Cl. .................................................. H02m 5/44
[50] Field of Search .................................. 323/58, 22 T; 307/261, 313; 321/18, 45, 2

[56] References Cited
UNITED STATES PATENTS
3,003,108 10/1961 Thiele ........................ 307/313 X
3,023,326 2/1962 Cone ........................... 307/313

ABSTRACT: A square wave output signal has a fixed voltage amplitude and a frequency directly proportionate to a voltage source which varies both in frequency and amplitude. Positive and negative reference voltages of equal magnitude are derived from a power supply connected directly to the voltage source. These reference voltages are respectively applied to the collectors of a pair of transistors which are interconnected at their emitters. The common emitter connection is connected to the primary of a transformer. A square wave is generated from the power supply and applied to the bases of the two transistors, thereby generating a square wave input to the transformer of fixed amplitude having a frequency corresponding to that of the voltage source.

PATENTED SEP 7 1971
3,603,863
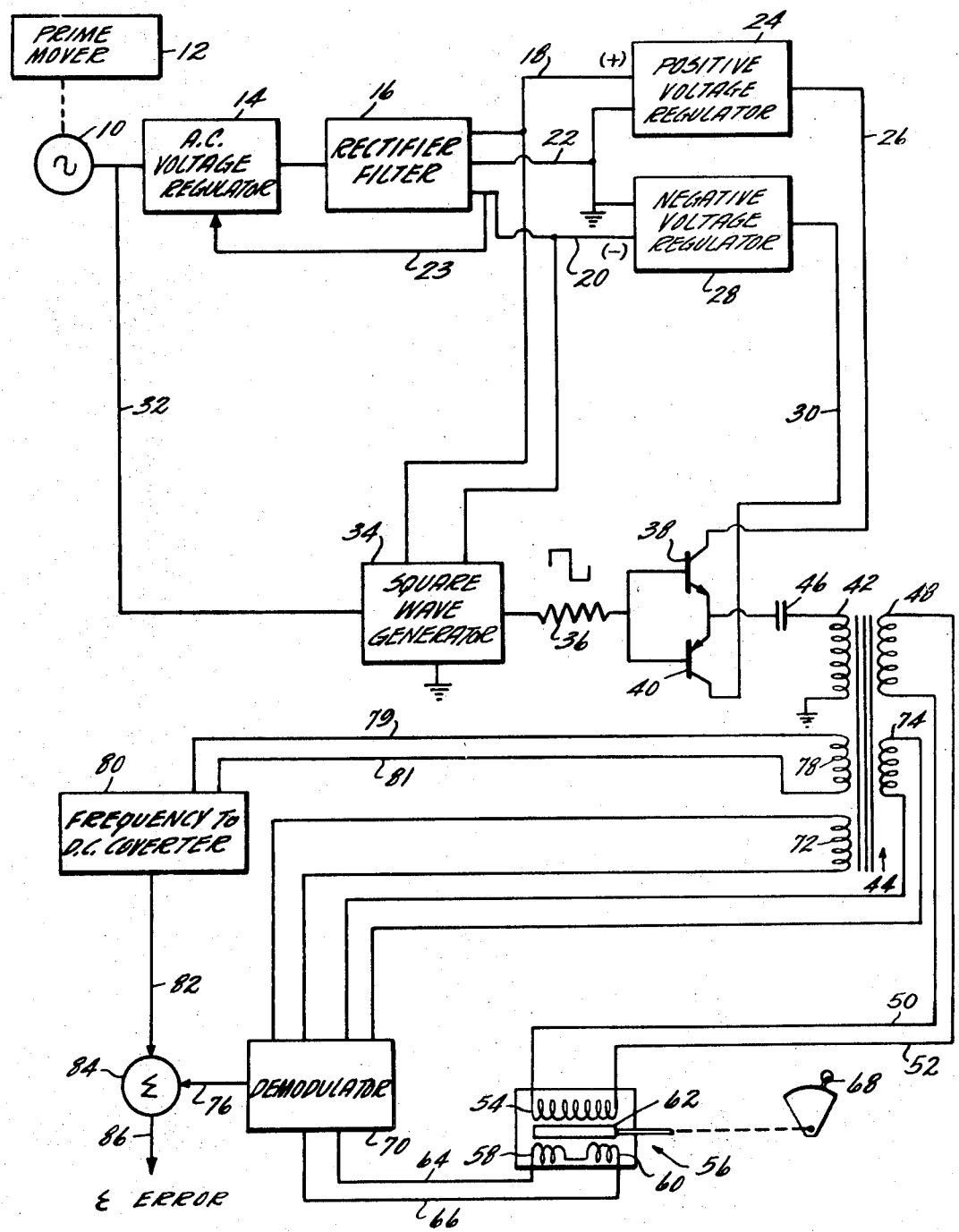
INVENTOR.
FLOYD GROSSOEHME
BY
ATTORNEY

CIRCUITRY FOR GENERATING A SQUARE WAVE OF FIXED VOLTAGE AMPLITUDE AND VARIABLE FREQUENCY

This application is a division of copending application Ser. No. 506,993 filed Nov. 9, 1965 now U.S. Pat. No. 3,501,687 and assigned to the assignee of the present invention.

The present invention relates to improvements in the excitation of transducers and to improvements in the generation of square wave voltages for this and other purposes.

The present invention is best understood by reference to the motivating environment therefor. In controlling the rate of operation of a prime mover such as a gas turbine engine, it is an accepted practice to generate direct current signals indicative of an actual rate of operation and a desired rate of operation. These signals are summed algebraically to derive an error signal which is then employed to change the rate of operation of the prime mover and bring it to what is the desired rate.

It is a known practice in the generation of the demand speed signal to employ a transducer of the type comprising a primary winding and a pair of opposed secondary windings. The magnetic coupling between the primary and secondary windings is controlled by a displaceable core which may be connected to a throttle or the like under the control of an operator. The amount of coupling between the primary and secondary windings establishes the strength and phase relationship of the output of the secondary windings, and this in turn reflects the desired rate of operation of the prime mover as set by the operator. The accuracy of the output signal from this transducer is a function of the manner in which the primary winding is excited and, accordingly, one object of the invention is to provide improved, simple, and economical means for accurately exciting transducers, of the present type, used in speed control as well as other purposes.

In accomplishing these ends, a square wave voltage having fixed amplitude and preferably equal positive and negative magnitude and a frequency directly proportionate to the frequency of a variable voltage source provided by the prime mover is employed through the use of improved square-wave-generating means provided in accordance with another object of the invention.

The improved electrical circuit provided by the present invention comprises a voltage source, as an alternator, which may be driven by a prime mover and is therefore variable as to frequency and potential. Electrical energy for exciting a transducer having input and output windings is to be derived from this voltage source. The transducer comprises means for varying the coupling between its primary and secondary windings as a function of physical displacement of a control member, whereby the strength of the signal on the output windings is likewise a function of such displacement. Excitation of the transducer is provided by means, connected to the voltage source, which generate a square wave having a fixed voltage amplitude and a frequency directly proportionate to the voltage source. By impressing this fixed-amplitude square wave on the primary winding of the transducer the output on the secondary thereof accurately reflects displacement of the control member.

The means for generating the square wave voltage impressed upon the transducer preferably comprise a power supply also excited from the voltage source driven by the prime mover and having positive and negative outputs of constant value and preferably of equal magnitude. These reference voltages are respectively applied to the collectors of a pair of transistors which are interconnected at their emitters. A square wave is generated by means of any suitable circuitry from the power supply and is applied to the bases of the two transistors, thereby generating a square wave output of fixed amplitude having a frequency corresponding to that of the voltage source. This output signal may then be applied to a transformer through a capacitor and the resulting induced signal may be used in any control circuitry.

The above and other related objects and features of the invention will be apparent from a reading of the following description of the disclosure found in the accompanying drawing and the novelty thereof pointed out in the appended claims.

The single FIGURE in the drawing is a schematic representation of an electrical circuit embodying the present invention.

In the circuit shown in the drawing, an alternator 10 is mechanically driven from a prime mover 12. While the illustrated circuit is a fragmentary portion of a control circuit for many different operating parameters of the prime mover 12, the alternator 10 is desirably the sole source of electrical current for the overall control circuit. The desirability of having such a single current source is apparent where the prime mover 12 would be used for propulsion purposes so that the electrical power therefor must be self-generated. As will be later apparent, the fragmentary portion of such an overall control circuit by which the present invention is illustrated provides an electrical signal for controlling the rate of operation of the prime mover.

It is desirable to provide a power supply from which positive and negative direct current voltages may be derived to be employed for several different purposes in the more comprehensive circuit referred to. Thus the output of the alternator 10 is controlled by an alternating current voltage regulator 14 providing an AC input to a rectifier filter circuit 16. From the rectifier filter circuit 16 leads 18 and 20 respectively provide positive and negative potentials relative to a ground connection 22. Operation of the AC voltage regulator is controlled by a feedback from one or both of the positive and negative output leads 18 and 20, illustratively shown by lead 23. The output on leads 18 and 20 provides coarsely regulated positive and negative direct current potentials. Preferably these potentials are then further regulated and filtered to provide substantially constant, positive and negative, direct current potentials of equal magnitude. To this end the positive lead 18 and the ground connection 22 extend to a positive voltage regulator 24 and the negative lead 20 and ground connection 22 extend to a negative voltage regulator 28. Employing known circuitry, the outputs of the voltage regulators 24 and 28 provide on the lead 26 and lead 30 respectively, substantially constant voltages of equal magnitude and opposite polarity.

The output of the alternator 10 is also employed to derive direct current signals which respectively indicate the actual rate of operation of the prime mover and a desired rate therefor which in the usual case would be under manual control.

In connection with deriving the direct current signal indicative of a desired rate of operation a lead 32 provides an input to a square wave generator 34 from the alternator 10. The actual circuitry employed by the square wave generator 34 may take many forms in accordance with known arrangements of the present state of the art. Energization of the generator 34, however, is preferably derived from the output leads 18 and 20 of the rectifier filter circuit 16. In this fashion the output signal strength of the generator 34, as it is developed across an input resistor 36, will be greater than the potentials at the outputs of the positive and negative voltage regulators 24 and 28 respectively. It is preferable that the square wave output of the generator 34 have the further characteristic of its positive half-cycle being equal to its negative half cycle under any steady-state operating condition. The output of the square wave generator 34 is applied to the bases of transistors 38 and 40, the transistor 38 being an NPN type and the transistor 40 being a PNP type. The collector of transistor 38 is connected to the lead 26 to provide a constant positive potential thereon, while the collector of the transistor 40 is connected to the lead 30 to provide a constant voltage potential thereon which is of the same magnitude as the potential at the collector of transistor 38 but of opposite polarity. The emitters of both the transistors 38 and 40 are connected to the primary 42 of a transformer 44 through a relatively large capacitor 46.

When the square wave output from the generator 34 functions as an actuating signal and when it goes positive, the transistor 38 is immediately conductive and results in a current flow through the primary 42. This is to say that the positive voltage (from lead 26) is immediately impressed across the primary 42. When the square wave signal goes negative, the transistor 38 immediately becomes nonconductive (as the transistor 40 previously was) and the transistor 40 becomes conductive so that the negative voltage is immediately impressed across the primary 42 and current flow therethrough is in the opposite direction.

The impedance of capacitor 46 over the frequency range of operation should be very small compared with that across the primary winding 42 so that the voltage changes obtained by the described switching action of transistors 38 and 40 are impressed, with essentially no change, across the winding 42. This arrangement is particularly effective in inducing equal and opposite current flows in the primary winding 42 without being affected by any asymmetrical relationship of the hysteresis loop of the core of the transformer 44. This is to say that without the capacitor 46 very minute variations in the positive and negative potentials from leads 26 and 30 or differences in the characteristics of the transistors 38 and 40, or differences in the individual characteristics of a particular transformer could result in substantial errors in the output signals induced into the several secondaries of the transformer 44. The capacitor 46 also protects the transistors 38 and 40 from excessive current flow as well as enabling continued operation of the overall circuit at a reduced voltage level in the event there is a failure in the means for applying the positive or negative voltages across winding 42.

Following through on the description of the generation of a direct current signal indicative of a desired speed, reference is made to the secondary 48 of the transformer 44 in which is induced the square wave signal having a constant amplitude with negative and positive pulses being of the same magnitude and of equal time duration under steady state operation. This square wave is then impressed across a primary winding 54 of a transducer 56 through leads 50 and 52 to provide excitation for the transducer 56.

Transducers of the present type are well known to those skilled in the art and are often referred to as linearly variable differential transformers. The transducer 56 further comprises opposed secondary windings 58 and 60. A movable core 62 is displaceable to vary the coupling between the primary and secondary windings. In such transducers there is a null point where the signals induced in the windings 58 and 60 are equal and opposed, and no output from the transducers is provided. Displacement of the core 62 in one direction or the other will respectively provide a signal output from the transducer, of one phase or another, on leads 66 and 64. Such output signal is indicative of the magnitude and direction of displacement of the core 62.

The core 62 is responsive to movement of some controlling parameter or parameter to be controlled and in the present instance is mechanically connected to a throttle lever 68 which the operator can manually set to establish a desired rate of operation for the prime mover 12.

A demodulator 70 is connected to the transducer output leads 64 and 66 and provides the direct current signal which is to be indicative of a desired speed. The demodulator 70 also involves use of circuit means well known to those skilled in the art. Energization of the demodulator 70 involves the use of opposed phase inputs which are preferably synchronized to the excitation of transducer 56 and to this end further secondary windings 72 and 74 are provided on the transformer 44 and operatively connected to the demodulator 70. The output leads 64, 66 are connected to the demodulator 70, and with this arrangement an output is provided on lead 76 which has a magnitude and polarity indicative of a desired rate of operation for the prime mover 12.

In order to provide a direct current signal indicative of the actual speed of the prime mover 12, a further secondary winding 78 is provided on the transformer 44. It will be apparent that the frequency of the square wave signal generated in the winding 78 is directly proportional to the rate of operation of the prime mover 12. This square wave input is then fed by leads 79 and 81 to a direct current converter which employs known means to derive from the square wave input thereto a direct current signal on lead 82 which is indicative of the actual rate of operation of the prime mover 12. The direct current signals on leads 76 and 82 are summed at a summation point 84 from which may be derived an error signal on lead 86. This error signal may then be employed in a known fashion to control the rate of operation of the prime mover 12 so as to reduce the error signal to zero and establish a steady state condition of operation.

It is, of course, known to those skilled in the art that the relative values of the real speed and actual speed signals must be correctly established to provide the above-described nulling type of operation.

It will also be apparent to those skilled in the art that the advantages of the present invention are not necessarily limited to the derivation of a speed error signal as above described, but are equally beneficial in the excitation of transducers employed for other purposes in control circuits for prime movers or the like, and further that certain features relative to the generation of a square wave signal will have broader application than herein described.

Having thus described the invention, what is claimed as novel and desired to be secured by Letters Patent of the United States is:

1. In an electrical circuit having a voltage source variable as to frequency and potential, means connected to said voltage source for generating a square wave output signal having a fixed voltage amplitude and a frequency directly proportionate to the frequency of the voltage source, said output signal generating means comprising:

a power supply excited from said voltage source and providing positive and negative outputs of substantially constant value, a square wave generator connected to and energized by said power supply, a transformer connected to said square wave generator and having primary and secondary windings, electronic switching means for alternately connecting the positive and negative outputs across said primary winding and including a relatively large capacitor through which both the positive and negative current from the power supply flows in passing to said primary windings, and means generating an actuating voltage, said switching means being responsive to said actuating voltage to immediately and simultaneously connect the positive output across the power supply and disconnect the negative output therefrom when the actuating voltage changes to one polarity and immediately and simultaneously to connect the negative output across said primary and disconnect the positive output when the actuating voltage changes to the other polarity, whereby an accurately controlled square wave voltage is induced into said secondary winding irrespective of any asymmetrical hysteresis relation in the transformer.

2. The electrical circuit of claim 1 wherein the positive and negative outputs of the power supply are of the same magnitude and less than that of the actuating voltage, the electronic switching means comprise an NPN transistor and a PNP transistor having their emitters connected together and their collectors respectively connected to the positive and negative outputs of said power supply and their bases connected to said actuating voltage generating means, and the primary transformer winding is connected to said emitters through said capacitor.